(12) United States Patent
Johnson et al.

(10) Patent No.: US 7,204,446 B2
(45) Date of Patent: Apr. 17, 2007

(54) DATA STORAGE TAPE GUIDING SYSTEMS USING TAPERED GUIDES

(75) Inventors: Douglas W. Johnson, Stillwater, MN (US); James S. Anderson, Chanhassen, MN (US); Richard W. Molstad, St. Paul, MN (US); Robert W. Tapani, Oakdale, MN (US)

(73) Assignee: Imation Corp., Oakdale, MN (US)

( * ) Notice: Subject to any disclaimer, the term of this patent is extended or adjusted under 35 U.S.C. 154(b) by 365 days.

(21) Appl. No.: 10/914,032

(22) Filed: Aug. 5, 2004

(65) Prior Publication Data

US 2006/0027694 A1  Feb. 9, 2006

(51) Int. Cl.
*G03B 23/02* (2006.01)
(52) U.S. Cl. .................. 242/346.2; 242/615.2
(58) Field of Classification Search ........... 242/346, 242/346.2, 615.2, 615.4, 566, 548, 548.2; 360/95, 130.21; 226/189, 196.1
See application file for complete search history.

(56) References Cited

U.S. PATENT DOCUMENTS

| | | | | |
|---|---|---|---|---|
| 3,939,494 | A * | 2/1976 | Okuda ..................... | 226/196.1 |
| 4,335,857 | A * | 6/1982 | Pfost et al. .............. | 242/346.2 |
| 4,441,133 | A * | 4/1984 | Ogawa et al. ........... | 242/615.2 |
| 5,173,828 | A * | 12/1992 | Tanzer et al. .......... | 360/130.21 |
| 5,414,585 | A * | 5/1995 | Saliba ................... | 360/130.21 |
| 5,772,143 | A * | 6/1998 | Runyon et al. ............ | 242/346 |
| 5,893,526 | A | 4/1999 | Zwettler | |
| 6,116,535 | A * | 9/2000 | Selg et al. ............... | 242/615.2 |
| 6,320,727 | B1 * | 11/2001 | Cope et al. ............ | 360/130.21 |
| 6,343,757 | B1 | 2/2002 | Zwettler | |
| 6,353,514 | B1 | 3/2002 | Rambosek et al. | |
| 6,563,670 | B2 | 5/2003 | Brong et al. | |
| 6,600,624 | B2 * | 7/2003 | Cope et al. ................ | 360/95 |
| 6,644,581 | B2 | 11/2003 | Plourde et al. | |
| 6,886,766 | B1 * | 5/2005 | Weng et al. ............. | 242/346.1 |
| 7,054,100 | B2 * | 5/2006 | Osaki et al. ............ | 242/346.2 |
| 2001/0020633 | A1 * | 9/2001 | Ojima ..................... | 242/615.2 |
| 2004/0238669 | A1 | 12/2004 | Mewes et al. | |

OTHER PUBLICATIONS

"Guide Arrangements for Data Storage Tape Guiding Systems," Johnson et al., U.S. Appl. No. 10/912,893, filed Aug. 5, 2004.

* cited by examiner

*Primary Examiner*—William A. Rivera
(74) *Attorney, Agent, or Firm*—Eric D. Levinson (57) ABSTRACT

The invention is directed to arrangements of tapered data storage tape guides which can improve the guiding of data storage tape. Tapered data storage tape guides having specific sizes relative to the data storage tape are also disclosed. The tapered data storage tape guides and arrangements of tapered guides can improve the ability to properly guide the data storage tape, e.g., during media fabrication, servo recording or readout, data recording or data readout. In one embodiment, a data storage tape guiding system may include a first tapered guide and a second tapered guide. The taper in the first guide can be opposite the taper in the second guide such that the data storage tape is forced against an upper flange of the first guide and forced against a lower flange of the second guide, or vice versa.

20 Claims, 6 Drawing Sheets

DATA STORAGE TAPE GUIDING SYSTEMS USING TAPERED GUIDES

TECHNICAL FIELD

The invention relates to magnetic tape used for data storage, and more particularly, for magnetic tape guides used to guide the magnetic tape during media fabrication, servo recording, data recording or data readout.

BACKGROUND

Data storage media are commonly used for storage and retrieval of data, and come in many forms, such as magnetic tape, magnetic disks, optical tape, optical disks, holographic disks, cards or tape, and the like. Magnetic tape media remains an economical medium that is particularly useful in storing large amounts of data. For example, magnetic tape cartridges, or large spools of magnetic tape are commonly used to back up large amounts of data for computing centers or businesses. Magnetic tape cartridges also find application in the backup of data stored on smaller computers such as desktop or laptop computers.

In magnetic tape, data is typically stored as magnetic signals that are magnetically recorded on the medium surface. The data stored on the magnetic tape is often organized along "data tracks," and read/write heads are positioned relative to the data tracks to write data to the tracks or read data from the tracks. Other types of data storage tape include optical tape, magneto-optic tape, holographic tape, and the like.

As the number of data tracks on data storage tape increases, the data storage capacity of the data storage tape likewise increases. However, as the number of data tracks increases, the tracks usually become narrower and more crowded on the surface of the data storage tape. Accordingly, an increase in the number of data tracks can make positioning of the read/write head relative to a desired data track more challenging. In particular, for proper data storage and recovery, the read/write head must locate each data track, and follow the path of the data track accurately along the surface of the data storage tape. In order to facilitate precise positioning of the read/write head relative to the data tracks on the data storage tape, servo techniques have been developed.

Servo information refers to signals, patterns or other recorded markings on the data storage tape that are used for tracking purposes. In other words, servo information is recorded on the data storage tape to provide reference points relative to the data tracks. A servo controller interprets detected servo information and generates position error signals. The position error signals are used to adjust the lateral position of the read/write head relative to the data tracks so that the read/write head is properly positioned along the data tracks for effective reading and/or writing of the data. A variety of different servo patterns have been developed, including time-based servo patterns, amplitude-based servo patterns, and other types of servo patterns. Time-based servo techniques typically make use of servo marks and time variables, as the servo marks feed past a head at a constant velocity. Amplitude-based servo techniques typically involve the detection of servo signal amplitudes, which enables identification of head positioning relative to the medium.

With some data storage tape, such as magnetic tape, the servo information is often stored in specialized tracks on the medium, called "servo tracks." Servo tracks serve as references for the servo controller. Conventional servo tracks typically hold no data except for information that is useful to the servo controller to identify positioning of a read/write head relative to the surface of the data storage tape. Alternatively, servo information may be interspersed within the data tracks, e.g., at regular intervals.

In any case, the servo information is typically recorded during media fabrication. Then, the servo information is sensed by one or more servo heads during servo readout, in order to pinpoint locations of the data tracks. For example, servo heads may be dedicated heads that read only servo information. Once the servo head locates a particular servo track, one or more data tracks can be located on the medium according to the data track's displacement from the servo track. The servo controller receives detected servo signals from the servo heads, and generates position error signals, which are used to adjust positioning of a read/write head relative to the data tracks.

The ability to properly guide the magnetic tape during media fabrication, servo recording, data recording and data readout can be a limiting factor in achieving improved track densities on magnetic tape, or other data storage tape. For example, the ability to record an increased number of servo tracks on magnetic tape can be limited by the ability to properly guide the magnetic tape during servo writing. Moreover, the ability to increase the density of servo tracks, and thereby allow for increased density of data tracks, can also be limited by tape guiding limitations. Furthermore, the ability to read the servo patterns, or to record and readout data tracks presents similar tape guiding challenges. As track densities continue to progress, these tape guiding challenges will become more significant.

SUMMARY

In general, the invention is directed to arrangements of tapered data storage tape guides which can improve the guiding of data storage tape. Tapered data storage tape guides having specific sizes relative to the data storage tape are also disclosed. The tapered data storage tape guides and arrangements of tapered guides can improve the ability to properly guide the data storage tape, e.g., during media fabrication, servo recording or readout, data recording or data readout. The invention is useful for magnetic tape, but may also find application with optical tape, holographic tape, or other formats of data storage tape.

In one embodiment, the invention provides a data storage tape guiding system comprising a set of guides arranged to guide a data storage tape along a tape path, the data storage tape guiding system including a first tapered guide including a first flange and a first tape path surface adjacent to the first flange, the first tape path surface defining a first taper angle relative to a non-tapered surface, wherein the first flange contacts a first edge of the data storage tape, and a second tapered guide including a second flange and a second tape surface path surface adjacent to the second flange, the second tape path surface defining a second taper angle relative to the non-tapered surface, wherein the second flange contacts a second edge of the data storage tape, and wherein the first taper angle is opposite the second taper angle.

In another embodiment, the invention provides a magnetic tape system comprising a magnetic tape, a magnetic head, and a set of guides arranged to guide the magnetic tape along a tape path over the magnetic head. The set of guides comprises a first tapered guide positioned before the magnetic head along the tape path and including a first flange and a first tape path surface adjacent to the first flange, the first tape path surface defining a first taper angle relative to a non-tapered surface, wherein the first flange contacts a first edge of the magnetic tape, and a second tapered guide positioned after the magnetic head along the tape path and including a second flange and a second tape surface path surface adjacent to the second flange, the second tape path surface defining a second taper angle relative to the non-tapered surface, wherein the second flange contacts a second edge of the magnetic tape, and wherein the first taper angle is opposite the second taper angle.

In another embodiment, the invention provides a guide for data storage tape comprising a tape path surface, an upper flange adjacent to the tape path surface, and a lower flange adjacent to the tape path surface. The upper flange is parallel to the lower flange, wherein the tape path surface is tapered with respect to the upper and lower flanges so as to be non-perpendicular to the upper and lower flanges. The tape path surface forms an acute angle with respect to one of the upper and lower flanges and forms an obtuse angle with respect to the other of the upper and lower flanges, wherein the tape path surface extends between the upper and lower flanges by a distance less than 0.001 inches (0.00254 cm) greater than the width of the data storage tape.

The invention may be capable of providing one or more advantages. In particular, the tapered data storage tape guides and arrangements of tapered guides described herein can generally improve the ability to properly guide the data storage tape. The tapered guides and arrangements of tapered guides may be used during media fabrication, servo recording, data recording, data readout or any other use for which accurate tape guiding is desirable. The invention is particularly useful for magnetic tape, but may also find application with optical tape, magneto-optic tape, holographic tape, or other formats of data storage tape.

For magnetic tape, the invention may be used during servo writing to improve the accuracy of recorded servo tracks, and thereby improve track density on the magnetic tape, resulting in improved storage capacity. For example, the tapered guides and arrangements of tapered guides described herein can significantly improve closed-loop tracking of recorded servo signals. In particular, when the invention is used during servo recording, a standard deviation of a tracking error associated with closed-loop tracking of the servo patterns during readout can be reduced to less than approximately 0.1 micron, which equates to track densities on the order of 3000 tracks per inch (1181 tracks per cm). This improvement in tracking can be achieved as a direct result to improvements in tape guiding during servo writing and readout, and, thus, improvements servo track linearity with respect to the tape edge.

The arrangements of tapered guides can also substantially reduce or eliminate cross-tape tension gradients at a location corresponding to a magnetic recording head. For example, a first guide can be positioned before a magnetic head and tapered in a first direction, and a second guide can be positioned after a magnetic head and tapered in a second direction. When the second tapered direction is directly opposite the first tapered direction, significant cross-tape tension gradients at the location corresponding to a magnetic recording head can be substantially eliminated, which is highly desirable because it avoids uneven head wear. At the same time, this arrangement of guides can improve the guiding accuracy, allowing for increased track densities on magnetic tape.

The details of one or more embodiments of the invention are set forth in the accompanying drawings and the description below. Other features, objects, and advantages of the invention will be apparent from the description and drawings, and from the claims.

DETAILED DESCRIPTION

The invention is directed to arrangements of tapered data storage tape guides which can improve the guiding of data storage tape. Tapered data storage tape guides having specific sizes relative to the data storage tape are also disclosed. The disclosed tapered data storage tape guides and arrangements of tapered guides may be used during media fabrication, servo recording, data recording, data readout or any other occasion during which accurate tape guiding is desirable. The invention is particularly useful for magnetic tape, but may also find application with optical tape, holographic tape, magneto-optic tape or other formats of data storage tape.

For magnetic tape, the invention may be used during servo writing to improve the linearity of recorded servo tracks. Moreover, the arrangements of tapered guides described herein may substantially reduce or eliminate significant cross-tape tension gradients at a location corresponding to a magnetic recording head, which can reduce or eliminate uneven head wear. When the invention is used during servo recording, a standard deviation of a tracking error associated with closed-loop tracking of the servo patterns during readout can be reduced to less than approximately 0.1 micron. This tracking improvement can be achieved as a direct result of the improved guiding during servo writing and the subsequent servo readout. The improved guiding allows for servo tracks (and therefore the data tracks) to have improved linearity parallel to the tape edge.

Figure 1:
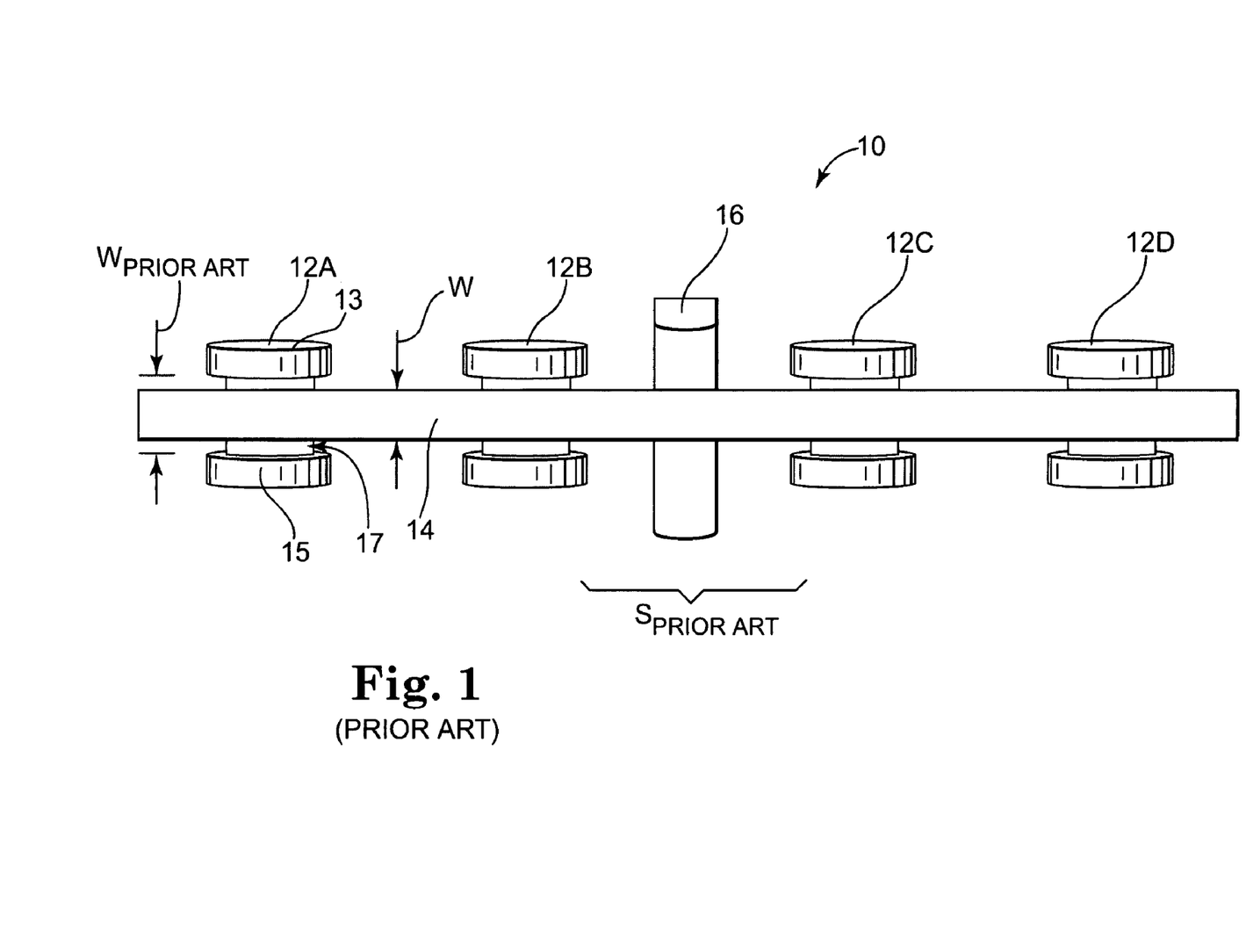
FIGS. 1 and 2 are perspective views of prior art magnetic tape systems, each including an arrangement of tape guides, a magnetic head and a magnetic tape passing through the guides and over the head.

FIG. 1 is a perspective view depicting a prior art magnetic tape system 10 including an arrangement of tape guides 12A–12D (collectively guides 12), a magnetic head 16, and a magnetic tape 14 passing through guides 12 and over head 16. Each of guides 12 is substantially similar, and will be specifically described with reference to guide 12A. As shown, guide 12A includes an upper flange 13, a lower flange 15 and a tape path surface 17 between flanges 13, 15. Magnetic tape 14 passes over tape path surface 17 and is guided between flanges 13, 15.

The width (W) of magnetic tape 14 is labeled on FIG. 1. In prior art tape guides, the width ($W_{PRIOR\ ART}$) between flanges 13, 15 of guide 12A is greater than the width (W) of magnetic tape. In particular, the width ($W_{PRIOR\ ART}$) is typically 0.005 inches (0.0127 cm) greater than the width (W) of magnetic tape 14. For example, prior art magnetic tape having a 0.5 inch (1.27 cm) tape width is typically guided by guides defining a tape path surface between the flanges of 0.505 inches (1.2827 cm) or greater.

Also, in prior art magnetic tape system 10, the spacing ($S_{PRIOR\ ART}$) between guides 12B and 12C is typically much larger than the width (W) of magnetic tape 14. In particular, the prior art spacing ($S_{PRIOR\ ART}$) between guides 12B and 12C is typically greater than 3 to 5 times the width (W) of magnetic tape 14.

Figure 2:
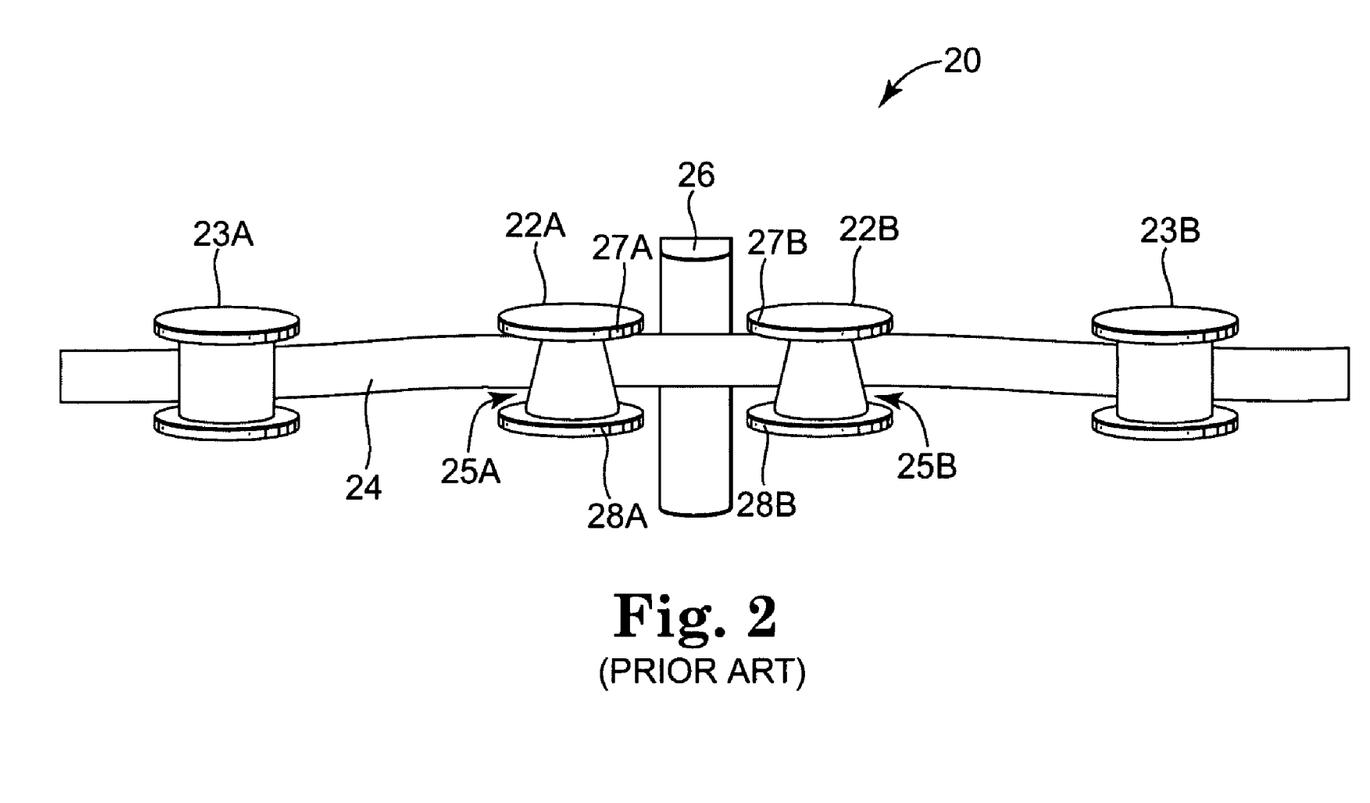

FIG. 2 is a perspective view depicting another prior art magnetic tape system 20. Prior art magnetic tape system 20 makes use of tapered guides 22A and 22B (collectively guides 22), as well as conventional non-tapered guides 23A, 23B (collectively guides 23). A magnetic tape 24 passes through guides 22, 23 and over head 26.

Tapered guides 22A and 22B each include a tape path surface 25A, 25B that is tapered with respect to flanges 27A, 28A and 27B, 28B. In other words, tape path surface 25A of guide 22A is non-perpendicular to flanges 27A and 28A and tape path surface 25B of guide 22B is non-perpendicular to flanges 27B and 28B. In this conventional arrangement, tape path surface 25A is tapered in the same direction as tape path surface 25B, causing the top edge of magnetic tape 24 to align against flanges 27A and 27B. One major drawback to this conventional approach, however, is that tapered guides 22A and 22B introduce a tension gradient across magnetic tape 24, which is undesirable. For example, a substantial tension gradient can cause uneven head wear, over time, or uneven fly height of tape over the head, degrading system performance.

Figure 3:
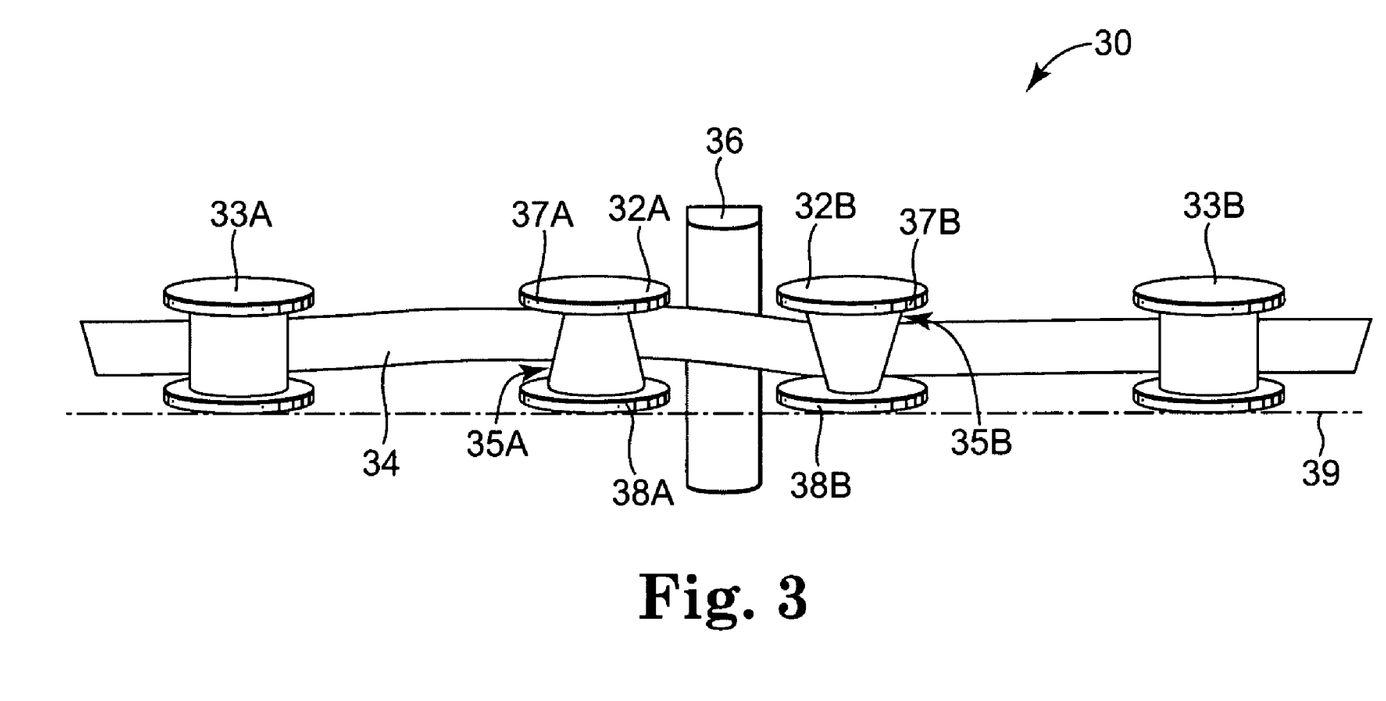
FIGS. 3 and 5 are perspective views of magnetic tape systems according to various embodiments of the invention.

FIG. 3 is a perspective view depicting a magnetic tape system 30 according to an embodiment of the invention. Magnetic tape system 30 makes use of tapered guides 32A and 32B (collectively guides 32), and may also include various non-tapered guides 33A, 33B (collectively guides 33). A magnetic tape 34 passes through guides 32, 33 and over head 36 to facilitate the recording or readout of servo patterns or data. A set of two or more of guides 32 may also be referred to herein as a tape guiding system. Head 36 and the other heads described herein may comprise servo write heads designed to write servo patterns on magnetic tape, or servo read heads designed to read the servo patterns. In other examples, head 36 may comprise a head designed for data recording or data readout.

Non-tapered guides 33 may comprise a generally cylindrical-shaped tape path surface, although other shapes could also be used. Tapered guides 32 may comprise a partial cone-shaped tape path surface, or may comprise a cylindrical shaped tape path surface that is non-perpendicular to a major plane of the disc-like flanges of the respective guide at the tape path. Other shapes could also be used, as long as the taper is formed in the guides.

Guides 32 and 33 may comprise polished steel, or any other material. Guides 32 and 33 may comprise hydrodynamic air bearing guides, in which case magnetic tape 34 "flies" over the tape path surfaces of guides 32 and 33 and the motion of magnetic tape 34 creates an air barrier between guides 32, 33 and magnetic tape 34. Alternatively, guides 32 and 33 may comprise hydrostatic air bearing guides, in which case magnetic tape 34 "flies" over guides 32 and 33, but the air is introduced by an external source to create the air barrier between guides 32, 33 and magnetic tape 34. In still other examples, guides 32 and 33 may comprise roller bearings, in which case, the tape path surfaces of the guides comprise rollers that roll with magnetic tape 34 as magnetic tape 34 feeds over guides 32 and 33.

In contrast to the conventional arrangement illustrated in FIG. 2, the invention illustrated in FIG. 3 makes use of tapered guides 32A and 32B which respectively draw magnetic tape 34 in opposite directions relative to head 36. In other words, the taper in guide 32A draws magnetic tape 34 upward toward top flange 37A, whereas the taper in guide 32B draws magnetic tape 34 downward toward bottom flange 38B. The opposing forces introduced to magnetic tape 34 by these opposing tapers cancel each other to substantially eliminate significant cross-tape tension at the location of magnetic tape 34 corresponding to magnetic head 36. In other embodiments, the first tapered guide along the tape path prior to the magnetic head could force the tape downward and the second tapered guide along the tape path after the magnetic head could force the tape upward.

Tapered guides 32A and 32B each include a tape path surface 35A, 35B that each define taper angles with respect to a non-tapered surface, e.g., a non-tapered surface of guides 33A, 33B. For example, tape path surfaces 35A, 35B may be tapered relative to a plane parallel to the tape path but perpendicular to flanges 37, 38. Put another way, tape path surface 35A of guide 32A may be non-perpendicular to flanges 37A and 38A and tape path surface 35B of guide 32B may be non-perpendicular to flanges 37B and 38B. However, unlike conventional arrangements, the first taper angle defined by tape path surface 35A is opposite the second taper angle defined by tape path surface 35B, causing the top edge of magnetic tape 34 to align against flange 37A, while the bottom edge of magnetic tape 34 aligns against flange 38B. In other words, tapered guides 32A and 32B force magnetic tape 34 in opposite directions with respect to one another, as the tape feeds past head 36. Each of tapered guides 32A and 32B introduce a tension gradient in magnetic tape 34, but the tension gradients substantially cancel one another at the location of head 36, directly between tapered guides 32A and 32B.

In general, the invention contemplates a first tapered guide including a first flange and a first tape path surface adjacent to the first flange, the first tape path surface defining a first taper angle relative to a non-tapered surface, wherein the first flange contacts a first edge of the data storage tape, and a second tapered guide including a second flange and a second tape surface path surface adjacent to the second flange, the second tape path surface defining a second taper angle relative to the non-tapered surface, wherein the second flange contacts a second edge of the data storage tape, and wherein the first taper angle is opposite the second taper angle. The magnetic tape may be forced upward and then downward by the two tapered guides on either side of the magnetic head, or can be forced downward and then upward.

The degree of taper in the respective tape path surfaces is typically between approximately 0.1 and 1 degree relative to a non-tapered surface, e.g., defined by guides 33A, 33B. For example, the upward taper angle of tape path surface 35A may be approximately 0.4 degrees and the downward taper angle of tape path surface 35B may be approximately 0.4 degrees in the opposite direction, i.e., −0.4 degrees. Providing the same degree of taper in opposing directions on opposing sides of magnetic head 36 can ensure that the opposing forces introduced to magnetic tape 34 by these opposing tapers cancels each other to eliminate any cross-tape tension in magnetic tape 34, particularly at the location where magnetic tape 34 passes over magnetic head 36. A cross-tape tension gradient is undesirable, for example, because it can cause uneven head wear or uneven fly height of tape over the head that can degrade system performance over time.

When opposing tapers are introduced on either side of magnetic head 36 using tapered guides 32A and 32B as illustrated in FIG. 3, the tape path deviates slightly from a linear tape path datum 39 as tape 34 passes over head 36. In order to compensate for this deviation from the linear tape path datum 39, magnetic head 36 can be tilted slightly so that the magnetic gaps of magnetic head 36 properly align with respect to magnetic tape 34. In other words, magnetic head 36 can be physically tilted so that it is precisely perpendicular to magnetic tape 34, albeit non-perpendicular to linear tape path datum 39. Alternatively, magnetic gaps of head 36 could be patterned so as to provide the necessary tilt in the gaps, without requiring any physical tilting of head 36 with respect to linear tape path datum 39.

Figure 4:
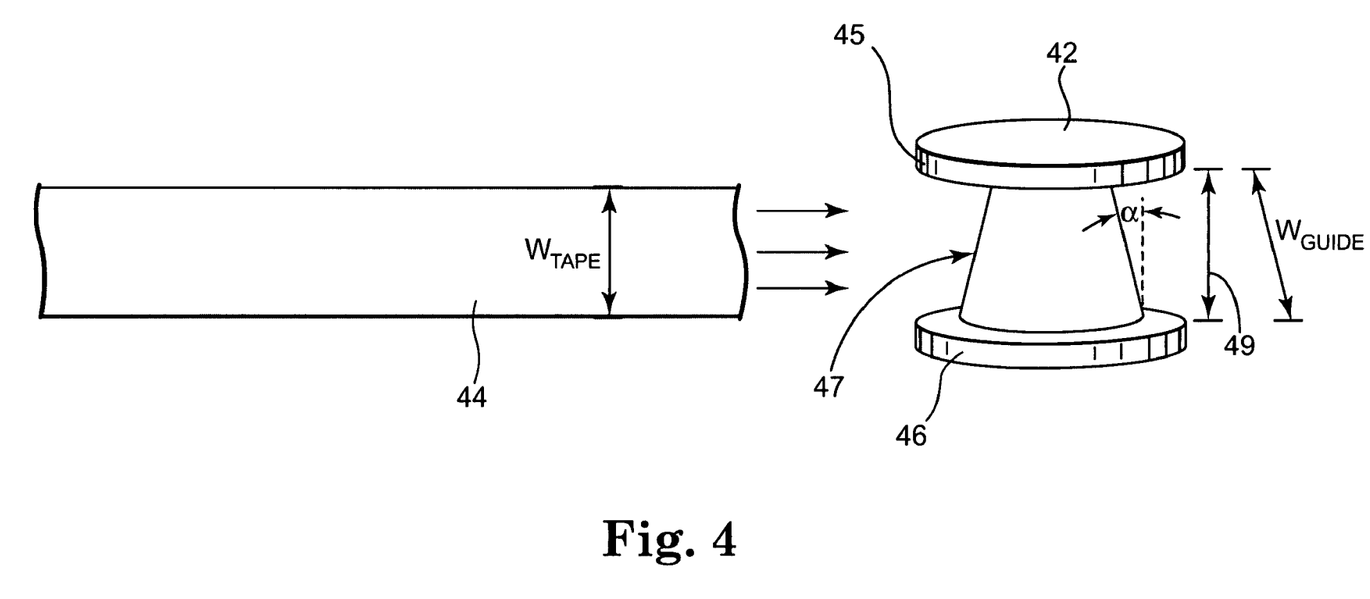
FIG. 4 is a perspective view of magnetic tape being passed over a tapered guide according to an embodiment of the invention.

FIG. 4 is a perspective view of a magnetic tape 44 that passes over tape guide 42 according to an embodiment of the invention. Tape guide 42 comprises a tape path surface 47 adjacent to flanges 45, 46. Tape path surface 47 may comprise a partial cone shape that magnetic tape 44 passes over, between flanges 45, 46. In other examples, however, the tape path surface may comprise a portion of a cylindrical shape that is non-parallel to flanges 45, 46, or another shape. Flanges 45, 46 may comprise disk-shaped edges that define the boundaries of the tape path.

In accordance with one aspect of the invention, guide 42 may define a width ($W_{GUIDE}$) relative to the width of magnetic tape 44 that is substantially reduced in comparison to the prior art. The width ($W_{TAPE}$) of magnetic tape 44 is labeled on FIG. 4. In accordance with one aspect of the invention, the width ($W_{GUIDE}$) is greater than the width ($W_{TAPE}$) by less than approximately 0.001 inches (0.00254 cm), and in some cases less than approximately 0.0005 inches (0.00127 cm). For example, if magnetic tape 44 has a 0.5 inch (1.27 cm) tape width, the tape path surface 47 of guide 42 defines a width less than approximately 0.501 inches (1.27254 cm), for example, and in some cases less than 0.5005 inches (1.27127 cm). In other cases, it may be desirable to define width ($W_{GUIDE}$) to be greater than width ($W_{TAPE}$) within the range of approximately 0.001 inches to 0.0005 inches in order to approximately match $W_{GUIDE}$ to the width ($W_{TAPE}$) of the tape 44, but allow for slight clearance to account for thermal expansion effects in the magnetic tape 44.

The taper angle α of tape guide 42 may be between approximately 0.1 and 1.0 degree. Taper angles in this range provide the desired effect of forcing magnetic tape 44 against flange 45 and away from flange 46, without causing damage to tape 44. At taper angles between approximately 0.1 and 1.0 degree, the width between flanges 45 and 46 (illustrated by numeral 49) would substantially approximate the width ($W_{GUIDE}$) of tape path surface 47. In that case, both the width between flanges 45 and 46 (illustrated by numeral 49) and the width ($W_{GUIDE}$) of tape path surface 47 would be between 0 and approximately 0.001 inches (between 0 and approximately 0.00254 cm) greater than the width ($W_{TAPE}$) of magnetic tape 44.

Because tape path surface 47 is tapered, it forms an acute angle with respect to flange 45 and an obtuse angle with respect to flange 46. The acute angle would be approximately 90 degrees minus the degree of the taper α, whereas the obtuse angle would be approximately 90 degrees plus the degree of the taper α. Thus, if taper angle α is approximately 0.4 degrees, the acute angle formed by tape path surface 47 and flange 45 would be approximately 89.6 degrees, and the obtuse angle formed by tape path surface 47 and flange 46 would be approximately 90.4 degrees. More generally, with a taper angle α between approximately 0.1 and 1.0 degrees, the acute angle is approximately between approximately 89.0 and 89.9 degrees, and the obtuse angle is between approximately 90.1 and 91.0 degrees.

Figure 5:
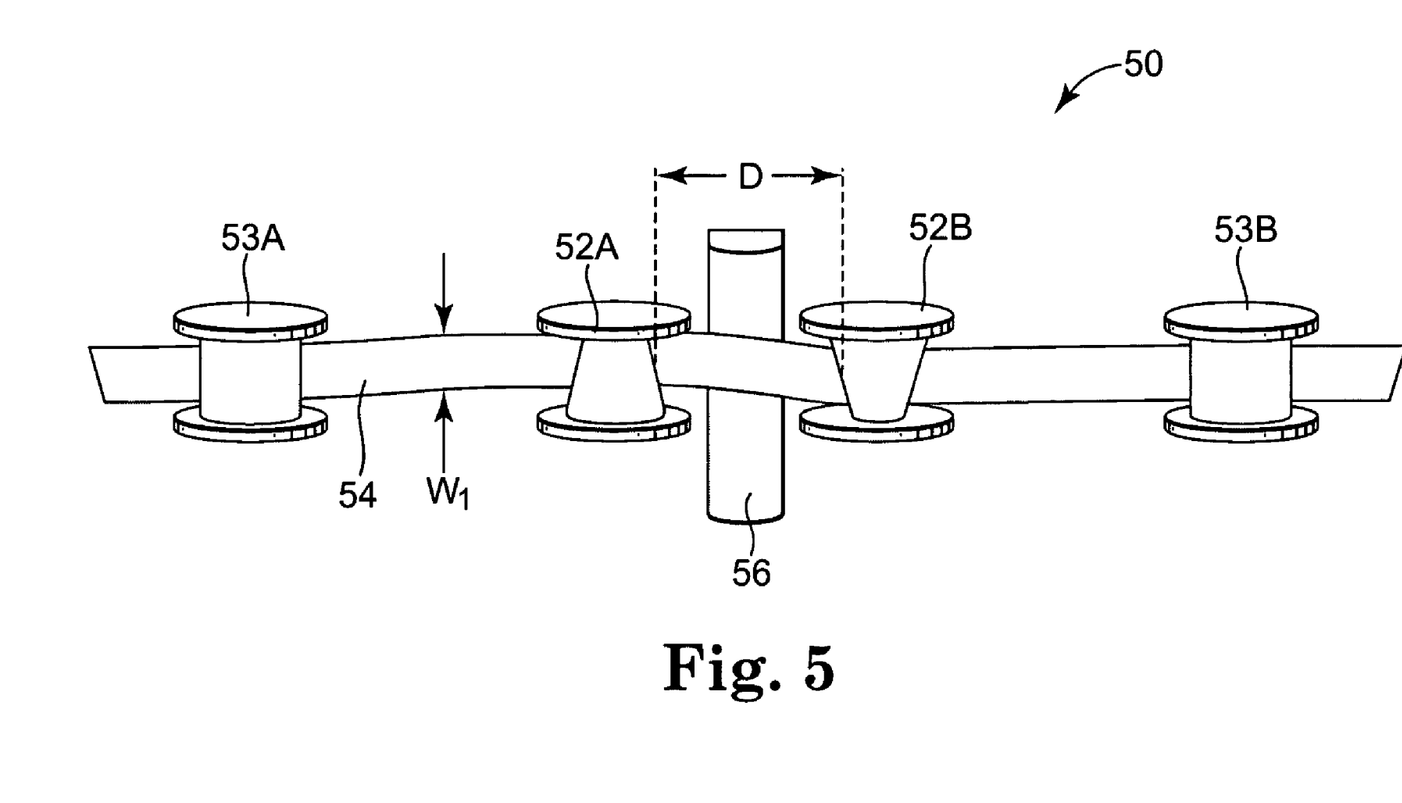

Moreover, reductions in the width of guides 42 relative to the width of magnetic tape 44 can significantly improve the ability to properly guide magnetic tape 44 over a head, as illustrated in FIGS. 3 and 5. The invention is particularly useful during servo writing because servo writing accuracy can be limited by an inability to accurately guide the magnetic tape over servo recording head. Reductions in the widths of guide 42, as described herein, can result in improved closed-loop tracking of recorded servo signals during readout verification of recorded servo signals. This improvement in tracking is due to the improved guiding during servo writing and subsequent readout. The improved guiding during servo writing, in particular, results in improved servo track linearity with respect to the tape edge, which allows for improved tracking during readout. Moreover, the width reductions to the tapered guides can be used in conjunction with the guide arrangements described herein to compound the improvements in tape guiding.

FIG. 5 is a perspective view depicting a magnetic tape system 50 according to another embodiment of the invention. Magnetic tape system 50 includes an arrangement of tape guides including tapered guides 52A and 52B (collectively guides 52), and may also include various non-tapered guides 53A, 53B (collectively guides 53). A magnetic tape 54 passes through guides 52, 53 and over head 56 to facilitate the recording or readout of servo patterns or data. A set of two or more of guides 52 may also be referred to herein as a tape guiding system.

Like the embodiment illustrated in FIG. 3, system 50 makes use of tapered guides 52A and 52B which respectively draw magnetic tape 54 in opposite directions relative to head 56. Non-tapered guides 53 may comprise a generally cylindrical-shaped tape path surface, although other shapes could also be used. Tapered guides 52 may comprise a partial cone-shaped tape path surface, or may comprise a cylindrical shaped tape path surface that is non-perpendicular to the flanges of the respective guide.

In accordance with another aspect of the invention, guides 52A and 52B can be arranged in a manner that further improves the ability to guide magnetic tape 54 over head 56. In particular, a distance (D) between guide 52A and guide 52B along the tape path is less than 2 multiplied by the width ($W_1$) of magnetic tape 54. In other words, guides 52A and 52B, which are positioned on either side of magnetic head 56 along the tape path, are moved closer to head 56, relative to prior art systems.

When the distance (D) between guides 52A and 52B is less than 2 multiplied by the width ($W_1$) of magnetic tape 54, servo signals can be recorded in a manner that results in significant improvements in the ability to perform closed-loop tracking on the servo signals, e.g., as a result of improved servo track linearity. The distance (D) is measured from the edge of the tape path surface of guide 52A to the edge of the tape path surface of guide 52B. For 0.5 inch wide magnetic tape (1.27 cm wide), the distance (D), for example, may be less than 1.0 inch (2.54 cm). The features and embodiments illustrated in FIGS. 3–5 may also be used in various combinations, thereby yielding aspects of the tape guiding advantages of both embodiments.

As described above, the various arrangements of tapered guides described herein can allow for the standard deviation of tracking errors associated with closed-loop tracking of the servo patterns to be reduced to less than approximately 0.1 micron. This improved tracking is a direct result of improved tape guiding during servo writing and readout. In particular, when the techniques described herein are used during servo writing, the recorded servo patterns have improved linearity on the magnetic tape, which allows for the improved closed-loop tracking during readout.

Because this disclosure is targeted at guiding improvements for magnetic tape (or other data storage tape), a standard should be defined with respect to this disclosure, to describe a reasonable servo actuator system that would be used to read servo patterns recorded using the guiding techniques described herein. It is common in the industry to measure open-loop guiding by reading the servo signal or measuring tape motion with a sensor, without moving the servo head or servo actuator. Then, one can simulate a reasonable closed-loop servo tracking response by passing the open-loop signal through a second order high pass filter. The equation for such a filter is:

$$FilterOutput(s) = \frac{s^2}{s^2 + s \cdot \omega_n / Q + \omega_n^2}$$

Where S is complex frequency in cycles per meter, $\omega_n$ is the natural frequency and Q is a unitless damping factor. Reasonable values for $\omega_n$ and Q for tape systems are 60 cycles per meter and 1.333 respectively. Using these values, a suppression curve can be developed and the closed-loop response can be statistically analyzed. Moreover, the standard deviation of the closed-loop tracking can be used as a measure of performance. A typical range of values for the standard deviation of the closed-loop tracking is 0.2 µm to 0.3 µm for modern tape transports with the capability of supporting up to 1500 tracks per inch (590.5 tracks per cm). In accordance with the invention, however, standard deviations of the closed-loop tracking can be reduced to less than 0.1 µm, which would support up to 3000 tracks per inch (1181 tracks per cm). Accordingly, aspects of the invention may allow the storage capacity of magnetic tape to double, based solely on guiding improvements during servo writing. Again, these improvements in tracking are due to the improved guiding during servo writing and readout, and thus, improved servo track linearity with respect to the tape edge.

Figure 6:
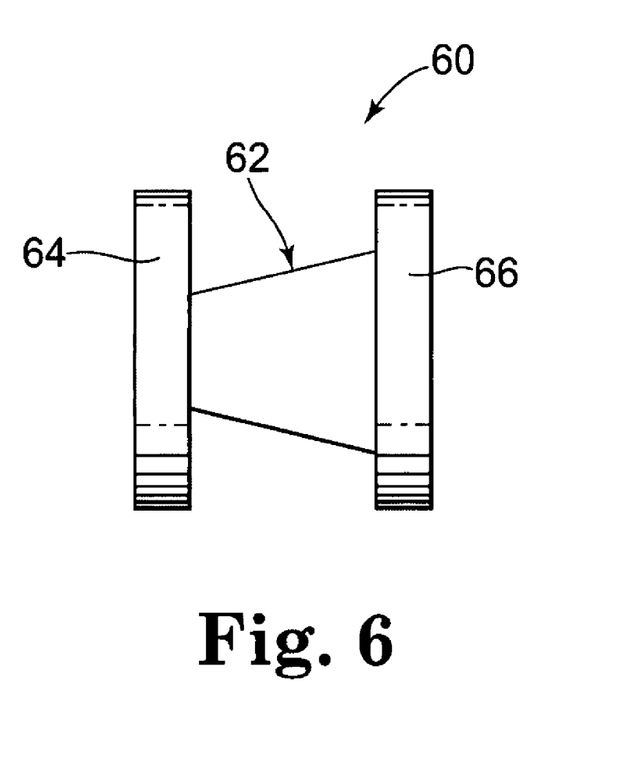
FIGS. 6 and 7 are cross-sectional views of two different embodiments of tapered guides according to embodiments of the invention.
Figure 7:
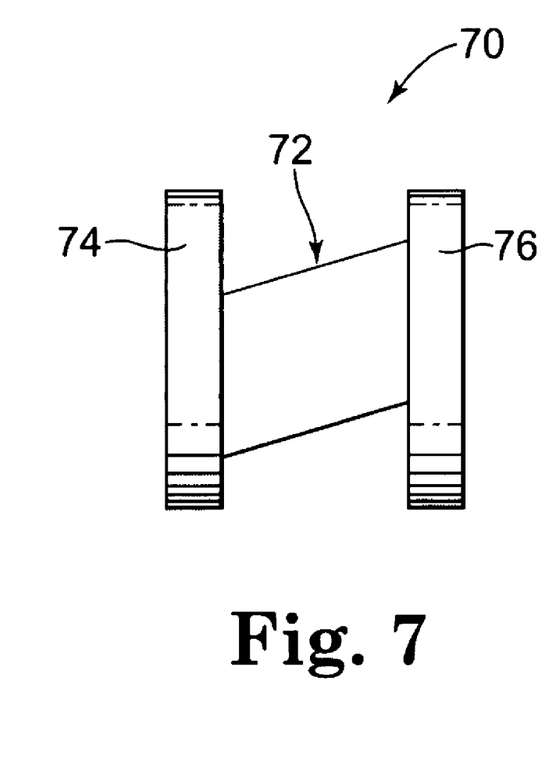

FIGS. 6 and 7 are cross-sectional views illustrating two alternative embodiments of tapered guides according to the invention. In FIG. 6, guide 60 includes a tape path surface 62 having a partial cone shape. Flange 64 forms an acute angle with tape path surface 62 and flange 66 forms an obtuse angle with respect to tape path surface 62. The taper formed in tape path surface 62 relative to a non-tapered surface may be between approximately 0.1 and 1 degree, e.g., 0.4 degrees.

In FIG. 7, guide 70 includes a tape path surface 72 having a cylindrical shape that is non-perpendicular to flanges 74, 76. During use, the specific orientation of guide 70 is important to ensure that flange 74 forms an acute angle with tape path surface 72 and flange 76 forms an obtuse angle with respect to tape path surface 72. The orientation is also important to ensure that the taper formed in tape path surface 72 relative to a non-tapered surface may be between approximately 0.1 and 1 degree, e.g., 0.4 degrees. Other shapes, such as non-symmetric shapes may also be used for the tape path surface 72 of the guides, so long as the desired taper is formed in the tape path surface 72 relative to the flanges 74, 76.

Various embodiments of the invention have been described that may be used individually or in combination with other embodiments to provide for improvements in tape guiding. Although primarily described in the context of magnetic tape guiding, the invention may also be useful in guiding holographic tape, optical tape, magneto-optic tape, or other future generation data storage media.

The guides described above have been primarily described and illustrated as guides having partial cone-shaped tape path surfaces. However, the same principles would apply to guides having cylindrical shaped tape path surfaces, as illustrated in FIG. 7. In that case, orientation of the guide is important to ensure that the desired taper is present on the tape path surface over which the tape passes during use. Other shaped guides could also be used, as long as the desired tapers are formed in the tape paths surfaces, as outlined herein. The guides may be formed of any desirable material, e.g., polished steel. In various examples, the guides may be air bearing hydrodynamic guides, air bearing hydrostatic guides, or non-air-bearing roller guides.

The guides and arrangements of guides may be used in servo writers, or various devices used during media fabrication. In other examples, guides and arrangements of guides may be used in tape drives, tape cartridges, or any other setting where tape guiding is desirable. As examples, the tapered guides and arrangements of tapered guides described herein may be used to guide the magnetic tape during media fabrication, servo recording and servo verification, servo readout, data recording or data readout. These and other embodiments are within the scope of the following claims.

The invention claimed is:

1. A data storage tape guiding system comprising a set of guides arranged to guide a data storage tape along a tape path, the data storage tape guiding system including:
   a first tapered guide including a first flange and a first tape path surface adjacent to the first flange, the first tape path surface defining a first taper angle relative to a non-tapered surface, wherein the first flange contacts a first edge of the data storage tape; and
   a second tapered guide including a second flange and a second tape surface path surface adjacent to the second flange, the second tape path surface defining a second taper angle relative to the non-tapered surface, wherein the second flange contacts a second edge of the data storage tape, and wherein the first taper angle is opposite the second taper angle.

2. The data storage tape guiding system of claim 1, wherein the first and second tape path surfaces are tapered in opposite directions at taper angles between approximately 0.1 and 1.0 degree.

3. The data storage tape guiding system of claim 1, wherein the first and second tape path surfaces are tapered in opposite directions at taper angles of approximately 0.4 degrees such that the first tape path surface and the first flange define an angle of approximately 89.6 degrees and the second tape path surface and the second flange define an angle of approximately 90.4 degrees.

4. The data storage tape guiding system of claim 3, wherein the tape path surfaces of the first and second tapered guides extend between the upper and lower flanges of the first and second tapered guides by a distance less than approximately 0.00254 cm greater than the width of the data storage tape.

5. The data storage tape guiding system of claim 1, wherein the first tapered guide includes an upper flange and a lower flange, the upper flange of the first tapered guide being the first flange, and wherein the second tapered guide includes an upper flange and a lower flange, the lower flange of the second tapered guide being the second flange.

6. The data storage tape guiding system of claim 1, wherein the tape path surfaces of each of the guides comprise a flyable surface formed of polished steel.

7. The data storage tape guiding system of claim 1, wherein the first and second tape path surfaces of the first and second tapered guides each comprise a portion of a cone shape.

8. The data storage tape guiding system of claim 1, wherein the first and second tape path surfaces of the first and second tapered guides each comprise a portion of cylindrical shapes non-perpendicular to the respective flanges.

9. A magnetic tape system comprising:
   a magnetic tape;
   a magnetic head; and
   a set of guides arranged to guide the magnetic tape along a tape path over the magnetic head, the set of guides comprising:
      a first tapered guide positioned before the magnetic head along the tape path and including a first flange and a first tape path surface adjacent to the first flange, the first tape path surface defining a first taper angle relative to a non-tapered surface, wherein the first flange contacts a first edge of the magnetic tape; and
      a second tapered guide positioned after the magnetic head along the tape path and including a second flange and a second tape surface path surface adjacent to the second flange, the second tape path surface defining a second taper angle relative to the non-tapered surface, wherein the second flange contacts a second edge of the magnetic tape, and wherein the first taper angle is opposite the second taper angle.

10. The magnetic tape system of claim 9, wherein a distance between the first guide and the second guide along the tape path is less than 2 multiplied by a width of the magnetic tape.

11. The magnetic tape system of claim 9, wherein the first flange of the first guide and the second flange of the second guide causes the magnetic tape to deviate from a linear tape path datum between the first and second guides, wherein the magnetic head is tilted so as to be perpendicular to the magnetic tape and non-perpendicular to the linear tape path datum between the first and second guides.

12. The magnetic tape system of claim 9, wherein the first and second tape path surfaces are tapered in opposite directions at taper angles of approximately 0.4 degrees such that the first tape path surface and the first flange define an angle of approximately 89.6 degrees and the second tape path surface and the second flange define an angle of approximately 90.4 degrees.

13. The magnetic tape system of claim 9, wherein the first tapered guide includes an upper flange and a lower flange, the upper flange of the first tapered guide being the first flange, and wherein the second tapered guide includes an upper flange and a lower flange, the lower flange of the second tapered guide being the second flange, wherein the tape path surfaces of the first and second tapered guides extend between the upper and lower flanges of the first and second tapered guides by a distance less than approximately 0.00254 cm greater than the width of the magnetic tape.

14. The magnetic tape system of claim 9, wherein the tape path surfaces of each of the guides comprise a flyable surface formed of polished steel.

15. The magnetic tape system of claim 9, wherein the first and second tape path surfaces of the first and second tapered guides each comprise a portion of a cone shape.

16. A guide for data storage tape comprising:
   a tape path surface;
   an upper flange adjacent to the tape path surface; and
   a lower flange adjacent to the tape path surface, the upper flange being parallel to the lower flange, wherein the tape path surface is tapered with respect to the upper and lower flanges so as to be non-perpendicular to the upper and lower flanges and wherein the tape path surface forms an acute angle with respect to one of the upper and lower flanges and forms an obtuse angle with respect to the other of the upper and lower flanges, wherein the tape path surface extends between the upper and lower flanges by a distance less than approximately 0.00254 cm greater than the width of the data storage tape.

17. The tape guide of claim 16, wherein the tape path surface defines a portion of a cone shape.

18. The tape guide of claim tape 16, wherein the tape path surface comprises a portion of a cylindrical shape.

19. The tape guide of claim 16, wherein the tape path surface comprises a flyable surface formed of polished steel.

20. The tape guide of claim 16, wherein a taper angle of the tape guide is between approximately 0.1 and 1.0 degree, such that the acute angle is approximately between 89.0 and 89.9 degrees and the obtuse angle is approximately between 90.1 and 91.0 degrees.

* * * * *